No. 724,360. PATENTED MAR. 31, 1903.
F. W. WILLIAMS.
HAY BALING MACHINE.
APPLICATION FILED MAY 15, 1902.
NO MODEL.

Witnesses:
Inventor:
Fred W. Williams

UNITED STATES PATENT OFFICE.

FREDERICK W. WILLIAMS, OF MACON, GEORGIA.

HAY-BALING MACHINE.

SPECIFICATION forming part of Letters Patent No. 724,360, dated March 31, 1903.

Application filed May 15, 1902. Serial No. 107,520. (No model.)

*To all whom it may concern:*

Be it known that I, FREDERICK WALTON WILLIAMS, a citizen of the United States, residing at Macon, in the county of Bibb and State of Georgia, have invented a new and useful Device Applicable to Hay-Baling Machines, of which the following is a specification.

My invention relates to a device for operating plunger-rod on hay-baling machines where there are two strokes of plunger to each revolution of power-stand.

My object is to provide a simple power with great leverage and long stroke, that distributes its power so as to be increased toward the end of each stroke and also start plunger off slowly, so feeder can arrange the hay, a power that will use all its force in pushing plunger forward, not backward, and that disengages itself as each stroke is spent and allows plunger-rod to return automatically and engage at the opposite side of power-stand, and to provide a guide for plunger-rod. I attain these objects by the mechanism illustrated in the accompanying drawings, in which—

Figure 4:
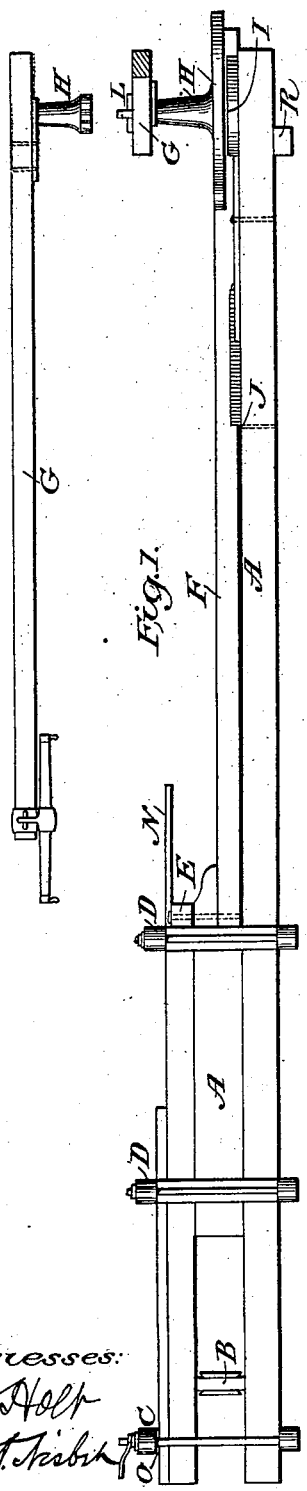
Figure 1:
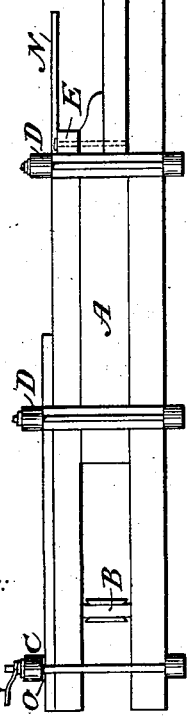
Figure 2:
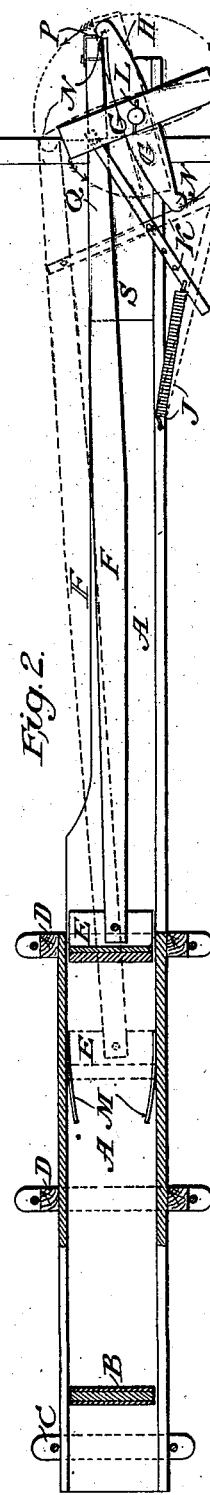
Figure 3:
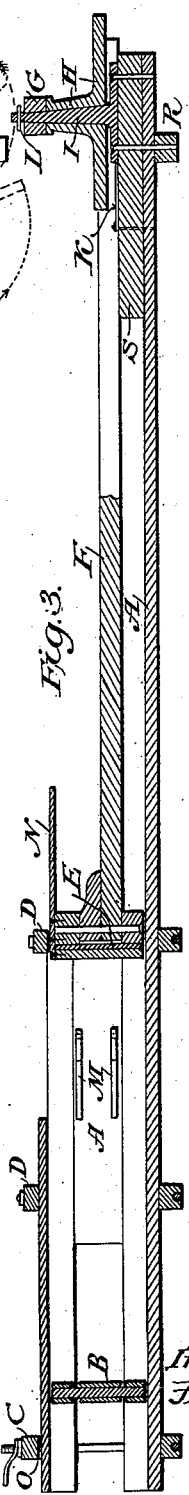

Figure 1 is a horizontal or working position of entire machine, showing power-lever G cut off near power-stand; Fig. 2, top view with top part of hay-box A removed and showing the working parts. Dotted lines show position of working part at about one-half travel of plunger. Fig. 3 shows horizontal section of entire machine. Fig. 4 shows power-lever G with hub H.

Similar letters refer to similar parts throughout the several views.

A is entire hay-box in which hay is compressed, the bottom of which extends out beyond power-stand, as shown in drawings.

B is division-block, two of which are used.

C is clamp, which is adjustable to B to make tension against which hay is pressed.

O is rubber pad.

D represents clamps, (or framework for hay-box.)

E is the plunger, which works longitudinally in box A, as shown by dotted lines in Fig. 2.

F is plunger-rod, operated by driving-arms N, (which are a part of hub H,) engaging end of plunger-rod F at P and passing off or disengaging itself at Q, plunger-rod F returning automatically to P by means of extension coil-spring J, fastened to box A and to guide-lever K.

G is power or propelling lever, fastened rigidly to hub H.

H is a rotatable hub, with two projecting arms in opposite directions, which rotates on axle I, as shown in Figs. 2 and 3. I prefer to carry out this feature of my invention as shown in Fig. 3, where it will be seen that axle I is fastened rigidly to box A by means of two bolts passing through axle-stand and block S and bottom of box A and one of which passes through cross-sill R.

I is axle, passing through hub H and lever G, with key at top; but this invention may be applied with center plates or otherwise in place of axle and may be propelled by any power by using any ordinary gearing in place of power-lever G, as shown in accompanying drawings.

J is extension coil-spring, as described.

K is guide-lever, pivoted near center and resting on block S, one end of which is fastened to plunger-rod F by means of bolt, which forms an axle or pivot, thereby keeping end of plunger-rod F in such position as it will engage driving-arms N at any point until the stroke is spent.

L is a key.

M represents spring-dogs.

N represents driving-arms, which are a part of H, both being made in one solid piece.

P is starting-point for plunger-rod.

Q shows point where driving-arms pass off plunger-rod F, as shown in Fig. 2.

R is cross-sill; S, block.

What I claim as my invention is—

1. In a hay-baling machine having a baling-box, a plunger, a plunger-beam and a power mechanism for reciprocating said plunger-beam with its plunger; the combination of a base connecting the baling-box and the power mechanism, and a spring-actuated guide-lever pivoted to the base and to the plunger-beam.

2. In a hay-baling machine having a baling-box, a plunger, a plunger-beam and a power mechanism for actuating said plunger-beam with its plunger; the combination of a base connecting the baling-box and the power mechanism, a lever pivoted to the base and to the plunger-beam, and a spring connected to the base and to the lever whereby the plunger-beam is retracted when disengaged from the power mechanism.

3. In a hay-baling machine having a baling-box, a plunger, a plunger-beam and a power mechanism for actuating the plunger-beam with its plunger; the combination of a base connecting the baling-box and the power mechanism, a lever pivoted to the base and to the plunger-beam and a spring connected to the base and to the lever, said lever being provided with means whereby the tension of the spring may be regulated.

4. In a hay-baling machine the combination of a bale-box, a plunger, a plunger-beam, a rotatable cross-head having a boss on each end on opposite sides of the cross-head for engagement with the plunger-beam, means to rotate the cross-head, a lever connected to a fixed part of the machine and to the plunger-beam and a spring connected to a fixed part of the press and to said lever.

In testimony whereof I have signed my name to this specification in the presence of two subscribing witnesses.

FRED. W. WILLIAMS.

Witnesses:
B. J. HOLT,
E. B. GERDING.